United States Patent [19]

Kondo et al.

[11] Patent Number: 4,977,007
[45] Date of Patent: Dec. 11, 1990

[54] SOLID ELECTROCHEMICAL ELEMENT AND PRODUCTION PROCESS THEREFOR

[75] Inventors: Shigeo Kondo, Hirakata; Tadashi Sotomura, Kashiwara, both of Japan

[73] Assignee: Matsushita Electrical Indust. Co., Japan

[21] Appl. No.: 97,367

[22] Filed: Sep. 8, 1987

[30] Foreign Application Priority Data

Sep. 19, 1986 [JP] Japan .............................. 61-223101
Nov. 5, 1986 [JP] Japan .............................. 61-263408
Mar. 26, 1987 [JP] Japan .............................. 62-72405

[51] Int. Cl.$^5$ ............................................. B32B 1/04
[52] U.S. Cl. .................................... 428/76; 428/207; 428/323; 428/375; 428/408; 428/480; 428/516; 428/522; 429/127; 429/193; 429/217; 264/164
[58] Field of Search ................. 429/127, 193, 217; 428/76, 209, 323, 375, 408, 516, 480, 522; 264/104

[56] References Cited

U.S. PATENT DOCUMENTS

| | | | |
|---|---|---|---|
| 4,247,499 | 1/1981 | Glugla et al. | 429/193 |
| 4,517,265 | 5/1985 | Belanger et al. | 429/127 |
| 4,589,197 | 5/1986 | North | 429/217 |
| 4,614,695 | 9/1986 | Ibbott | 429/127 |

Primary Examiner—Patrick Ryan

[57] ABSTRACT

A solid electrochemical element which is flexible and has improved resistance to environmental exposure includes at least one solid electrolyte sheet which is flexible, has a pair of opposing surfaces, and is comprised of solid electrolyte particles and a plastic resin, which plastic resin was coated on each particle of the solid electrolyte particles prior to formation of the at least one solid electrolyte; and at least two electrode sheets comprised of an electrode material, one of the at least two electrode sheets being provided on each of the pair of opposing surfaces of the at least one solid electrolyte sheet, wherein an ion conductive path is formed between the pair of opposing surfaces of the at least one solid electrolyte sheet by virtual contact of the solid electrolyte particles and the electrode material. A process for producing the solid electrochemical element uses, as starting materials, (a) solid electrolyte particles coated with a thin layer of a plastic resin and (b) electrode material particles coated with a thin layer of a plastic resin, and preferably includes a step of crushing the solid electrolyte particles by pressing.

17 Claims, 4 Drawing Sheets

SOLID ELECTROCHEMICAL ELEMENT AND PRODUCTION PROCESS THEREFOR

BACKGROUND OF THE INVENTION

1. Field of the invention

The present invention relates to a solid electrochemical element, which includes an ion conductor and the constituent members of which are all solid, such as a solid cell, a solid electrical double layer capacitor, a solid electrochromic display or the like, as well as to a process for producing said element.

More particularly, the present invention relates to a solid electrochemical element with excellent mechanical strength and excellent environmental resistance which is constituted by (a) an ion conductor comprised of a solid electrolyte and an insulating supporting substance, such as a plastic resin or the like, and having flexibility and excellent environment resistance, and (b) an electrode material in particulate form, as well as to a process for producing said element.

2. Description of the Related Art

Solid electrochemical elements whose constituent members are all solid are advantageous in that they have no problem of liquid leakage and they can be easily produced in a small and thin shapes. In constituting such an element, there is required a solid ion conductor for moving ions within the element, namely, a solid electrolyte. The solid electrolyte is classified by the type of movable ion, such as $Li^+$-conductive solid electrolyte, $Ag^+$-conductive solid electrolyte, $Cu^+$-conductive solid electrolyte, $H^+$-conductive solid electrolyte, etc. A solid electrochemical element is constituted by combining one of these solid electrolytes with an appropriate electrode material.

Not only solid electrolytes, but also electrolytes in general have no directional property or no anisotropy with respect to the ion conductivity and, accordingly, have a random ion conductivity. Therefore, a solid electrochemical element is ordinarily constituted by shaping a solid electrolyte powder into a layer by pressing or into a thin film by vapor deposition and providing a pair of electrodes on both surfaces of the layer or the thin film to form one solid electrochemical element per one solid electrolyte layer.

In ordinary electrochemical elements using a liquid electrolyte, electronic and ionic contact between electrolyte and electrode material can be easily obtained. In contrast, in solid electrochemical elements constituted by solid substances, generally, it is not easy to obtain electronic and ionic contact between solid electrolytes, between electrode materials or between solid electrolyte and electrode material. In electrochemical elements using a liquid electrolyte, it is usual to add foreign matter such as a binder or the like to the electrolyte or the electrode in order to prevent leakage of the electrolyte or to prevent excessive penetration of the electrolyte into the electrode and the resulting deformation of the electrode. Meanwhile, in solid electrochemical elements, the addition of foreign matter is ordinarily avoided because it reduces said electronic and ionic contact.

If no foreign matter is used, the solid electrochemical elements, when produced in a large and thin shape, generally tend to lack in elasticity and consequently are fragile to mechanical impacts and easily destroyed or impaired.

Further, in solid electrochemical elements, the solid electrolyte generally comprises a chemically active monovalent cation as a conducting element. This monovalent cation, when exposed to oxygen or moisture in the atmosphere, is converted to a divalent cation by oxidation or immobilized in the electrolyte crystal as an oxide, whereby the conducting function of the electrolyte is lost.

Furthermore, when a plurality of solid electrochemical elements are arranged into an element group wherein they are connected in series or in parallel, it is necessary to isolate each constituent element of the element group electronically and ionically. In this case, since the electrolyte used in each element generally has random ion conductivity and has no anisotropy, each element must have an electrolyte layer ionically isolated from other electrolyte layers. Without this isolation, the ionic flow within the electrolyte of one element not only occurs between the electrodes of the element but also spreads into the electrodes of other elements, whereby the element group fails to exhibit its desired function. This is a problem when a solid electrochemical element is produced in a small or miniature size, which is a feature of solid electrochemical elements, in addition to the above-mentioned problem when a solid electrochemical element is produced in a large and thin shape. The isolation of each element in an element group requires complicated assembly steps including photolithography, etc. as used in an ordinary semiconductor assembly line.

SUMMARY OF THE INVENTION

The present invention to solve the above mentioned problems of conventional solid electrochemical elements. According to the present invention, there is provided a flexible, environment-resistant ion conductor comprised of a solid electrolyte in particulate form and supporting substance which is an insulator and which surrounds the solid electrolyte, preferably comprised of a solid electrolyte in particulate form and a supporting substance which is a plastic. There is further provided an ion conductor having an ion conductivity which is anisotropic by allowing the plastic resin to have a thickness which is approximately the same as the particle diameter of the solid electrolyte particles or by alternately stacking layers of a sheet of a solid electrolyte and a sheet of a supporting substance for the solid electrolyte, such as a plastic resin or the like and cutting the resulting laminate in the thickness direction.

Such an ion conductor is produced by a process including a step of crushing solid electrolyte particles by pressing. Preferably, solid electrolyte particles and a plastic resin powder or grains are mixed in with a solvent or under heating and the mixture or its melt is shaped by rolling to obtain an ion conductor in sheet form.

According to the present invention there is furthermore provided a solid electrochemical element with flexibility and environmental resistance by surrounding solid electrolyte particles and electrode material particles with a plastic resin.

This solid electrochemical element is produced by separately or jointly mixing solid electrolyte particles and electrode material particles with a plastic resin in a solvent or hot mixing these particles directly with a plastic resin powder or grains to obtain particles coated with said plastic resin, and separately shaping these coated particles to produce a shaped material of coated solid electrolyte particles and a shaped material of coated electrode material, followed by joining; or jointly shaping these two coated materials into one integral body. Preferably, the solid electrochemical element is produced by a process including a step of crushing solid electrolyte particles by pressing.

BRIEF DESCRIPTION OF THE DRAWINGS

FIG. 1 is a schematic view showing the structure of an embodiment of the ion conductor of the present invention. In FIG. 1, solid electrolyte particles 1 are surrounded by a supporting substance 2 for supporting the solid electrolyte particles 1, except for the upper and lower surfaces thereof which are exposed as is necessary for the formation of an ion-conductive path.

FIG. 2 is a schematic representation of the steps for producing an ion conductor according to the present invention. A mixture 4 consisting of solid electrolyte particles 1, a supporting substance 2 for the solid electrolyte particles 1 and a solvent is applied by screen-printing onto a substrate 3 with a spatula 6 in FIG 2A, dried and then rolled by rollers 7 and 8 in FIG. 2C, whereby an ion conductor is produced.

In conventional ion conductors consisting of a solid electrolyte or in conventional solid electrochemical elements including a solid electrolyte, the use of a foreign substance has been avoided usually. However, the ion conductor or solid electrochemical element including an ion conductor of the present invention uses a foreign substance, namely, an insulating material, which supports and surrounds a solid electrolyte. That is, the solid electrolyte material or the electrode material is surrounded by an insulating supporting material for the solid electrolyte, preferably a plastic resin material, except for the portions thereof, respectively which form an ion- or electron-conductive path, optionally having a particular directionality. Accordingly, the insulating, supporting substance for the solid electrolyte is pushed into the gaps between the solid electrolyte particles or between the electrode material particles in forming an ion conductor (a shaped material of solid electrolyte) or a shaped electrode material or in assembling a solid electrochemical element, whereby an aggregate of particles is formed in which the neighbouring particles are in direct contact with one another and each particle is surrounded by the insulating, supporting substance for the solid electrolyte. As a result, the particles, as constituent members of the ion conductor, the electrode or the solid electrochemical element are given an aggregate shape, can secure an electrical and ionic contact, and are not directly exposed to oxygen and moisture in the air so that they are less likely to undergo deterioration.

These merits can be obtained more effectively by employing a step of crushing the solid electrolyte particles by pressing, in a process for producing an ion conductor (a shaped material of solid electrolyte), a shaped electrode material or a solid electrochemical element. When the solid electrolyte particles coated with a plastic resin (an insulating, supporting substance for the solid electrolyte) is crushed by pressing, there appear surfaces thereof not coated with the plastic resin and, through these surfaces, there occurs a direct contact between the solid electrolyte particles or between these particles and electrode particles. Thus, there can be obtained a sheet-type ion conductor (a shaped material of solid electrolyte) with flexibility and excellent ion conductivity, as well as a shaped electrode material, and, as a result, there can be obtained a solid electrochemical element having excellent mechanical strength and excellent environmental resistance, and which is capable of generating a large current.

The ion conductor of the present invention can also be formed in a sheet shape wherein surfaces of solid electrolyte particles are coated with an insulating supporting substance for the solid electrolyte (e.g., a plastic resin) except for particular surfaces, for example, upper and lower surfaces thereof. When two or more pairs of electrodes are provided on upper and lower surfaces of the ion conductor, the electrodes cover and contact the upper and lower surfaces of the solid electrolyte particles which are not coated with the insulating supporting substance and, thus, the electrodes and the ion conductor are connected ionically. Within the ion conductor sheet, the ions do not move in the lateral direction but only in the vertical direction of the sheet, whereby no ionic flow occurs between two neighbouring electrodes or between two neighbouring but opposing electrodes. Thus, it is possible to constitute, using only one ion conductor sheet, a solid electrochemical element group consisting of a plurality of solid electrochemical elements which are electrically independent from one another, by providing two or more pairs of opposing electrodes on the two opposing surfaces of an ion conductor sheet.

In the present invention, there is used an ion conductor consisting of solid electrolyte particles coated with an insulating supporting substance for the solid electrolyte. When this ion conductor is used in a solid electrochemical element, upper and lower surfaces of the ion conductor are provided with electrodes. Therefore, the ion conductor may be produced in such a manner that the upper and lower surface on which electrodes are to be provided, may be coated very thinly or may not be coated substantially with an insulating supporting substance for the solid electrolyte in order to obtain a good ionic contact between the ion conductor and the electrodes.

The insulating supporting substance for the solid electrolyte according to the present invention can be any substance as long as it can surround the solid electrolyte particles and can form a flexible aggregate of the solid electrolyte particles. Particularly, a plastic resin is preferred. As the plastic resin, there can be preferably used those which can be stably mixed with a solid electrolyte containing a high concentration of a chemically active monovalent cation such as $Na^+$, $Li^+$, $Ag^+$, $Cu^+$, $H^+$ or the like, or with an electrode material, as a strong oxidizing agent or a strong reducing agent. Such plastic resins include, for example, polyethylene, polypropylene, synthetic rubbers (e.g., styrene-butadiene rubber, Neoprene rubber), silicone resins, acrylic resins, etc.

When a polyethylene, polypropylene or acrylic resin is used, the fine powder of the resin is dry-blended with solid electrolyte powder or grains, or with electrode material powder or grains. The particle diameter of the resin preferably ranges from 1/10 to 1/10,000 times the particle diameter of each powder particulate or grain. During the blending, the particles of polyethylene, polypropylene or acrylic resin coat the surface of each particle of the solid electrolyte owing to the static electricity generated between the respective particles.

When a synthetic rubber, such as styrene-butadiene rubber, Neoprene rubber or the like, a silicone resin or an acrylic resin is used, wet blending is conducted using an organic solvent, such as toluene, xylene or the like.

That is, a synthetic rubber, an acrylic resin or a silicone resin is dissolved in an organic solvent in an amount ranging from 5 to 20% by weight; to the solution is added a solid electrolyte powder or grains, or an electrode material powder or grains; they are mixed and dispersed to obtain a slurry; the slurry is cast on a TEFLON sheet; and the solvent is removed under vacuum, if necessary with heating, whereby a shaped body can be obtained. Alternatively, the slurry itself can be treated under vaccum to remove the solvent and then shaped by pressing.

The solid electrolyte used in the present invention includes $Li^+$-conductive solid electrolytes, such as $LiI$, $LiI.H_2O$, $Li_3N$, $Li_4SiO_4$-$Li_3$-$Li_3PO_4$, polyethylene oxide-$LiCF_3SO_3$ and the like; $Ag^+$-conductive solid electrolytes, such as $RbAg_4I_5$, $Ag_3SI$, $AgI$-$Ag_2O$-$MoO_3$ glass and the like; $Cu^+$-conductive solid electrolytes, such as $RbCu_4I_{1.5}Cl_{3.5}$, $RbCu_4I_{1.25}Cl_{3.75}$, $K_{0.2}Rb_{0.8}Cu_4I_{1.5}Cl_{3.5}$, $CuI$-$Cu_2O$-$MoO_3$ glass and the like; $H^+$-conductive solid electrolytes, such as $H_3Mo_{12}PO_{40}.29H_2O$, $H_3W_{12}PO_{40}.H_2O$ and the like; and $Na^+$-conductive solid electrolytes represented by $Na$-$\beta$-$Al_2O_3$ (sodium $\beta$-alumina) or $Na_{1+x}Zr_2P_{3-x}Si_xO_{12}$ ($0 \leq x \leq 3$).

As the electrode material of the present invention, there can be used, for example, carbon materials, such as graphite, acetylene black, active carbon and the like; sulfides, such as titanium sulfide, niobium sulfide, cuprous sulfide, silver sulfide, lead sulfide, iron sulfide and the like; oxides, such as tungsten oxide, vanadium oxide, chromium oxide, molybdenum oxide, titanium oxide, iron oxide, silver oxide, copper oxide and the like; halides, such as silver chloride, lead iodide, cuprous iodide and the like; and metal materials, such as copper, silver, lithium, gold, platinum, titanium and their alloys.

A solid electrolyte cell or battery can be constituted by combining an ion conductor (a shaped material of solid electrolyte particles) and an electrode material which can give ions to the ion conductor or receive ions therefrom, such as titanium disulfide or the like.

A solid electrochemical display element (a solid electrochromic display) can be constituted by using an ion conductor and an electrode material which can give or receive ions and simultaneosuly cause an optical change, such as tungsten oxide or the like.

A solid electrical double layer capacitor can be constituted by using an ion conductor and an electrode material which does not give or receive ions but which can form an electrical double layer at the interface with the ion conductor, such as active carbon or the like.

All of these solid electrochemical elements according, to the present invention have sufficient flexibility, excellent mechanical strength and an excellent environmental resistance.

A solid electrolyte, for example, a powder of $RbCu_4I_{1.5}Cl_{3.5}$ 100% of which passes through a 200 mesh, is dispersed in a toluene solution of a styrene-butadiene copolymer so that the volume fraction of the powder after drying, becomes 85%. The resulting slurry is spread on a TEFLON sheet using an applicator bar and placed in dry air to remove the toluene, whereby a flexible sheet-type ion conductor (a shaped material of solid electrolyte particles) having no fluidity is obtained. This ion conductor can be used as it is for constitution of a solid electrochemical element but, by rolling it with a roller press so as to have a thickness of about ⅜ or less of the original thickness, can be made into a sheet-type ion conductor with improved ion conductivity wherein the solid electrolyte particles have been crushed by pressing.

A shaped electrode can also be formed in a similar manner. In forming a shaped electrode using, for example, copper as the electrode material, a copper powder having particle diameters of 5 microns or less and a $RbCu_4I_{1.5}Cl_{3.5}$ powder having particle diameters 100% of which pass through a 200 mesh are mixed in a weight ratio of 90:10. The mixed powder is dispersed in a toluene solution of a styrene-butadiene copolymer so that the volume fraction of the mixed powder after drying becomes 90%. The resulting slurry is spread on a TEFLON sheet using an applicator bar and placed in dry air to remove the toluene, whereby a flexible sheet-type shaped electrode material is obtained. It can be rolled by a roller press to have a thickness of about ⅜ or less of the original thickness, whereby an electrode having an excellent electrical conductivity and an excellent ionic conductivity can be obtained.

By press-molding an ion conductor interposed between shaped electrode materials thus obtained together with, if necessary, other constituent members such as a current collector, into one integral body, a solid electrochemical element can be obtained.

Production of a solid electrochemical element can be conducted as above by making a shaped ion conductor and a shaped electrode material into one integral body. Alternatively, it can be conducted by directly shaping the respective powders or grains coated with a plastic resin into one integral body.

DESCRIPTION OF THE PREFERRED EMBODIMENTS

The present invention will be described in detail below by way of Examples and Comparative Examples.

Example 1

Figure 1A:
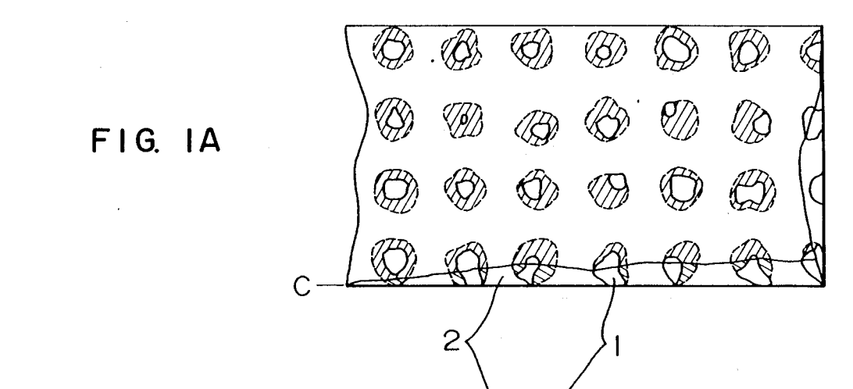
FIG. 1A is a schematic top plan view and FIG. 1B is a schematic sectional side elevational view.
Figure 1B:
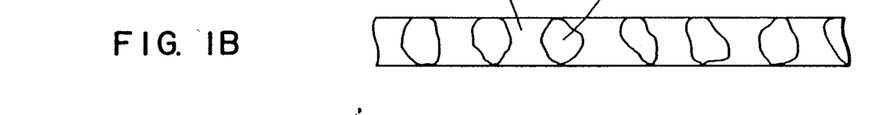

FIG. 1 shows the structure of an ion conductor according to the present invention. FIG. 1(A) is a plan view of the ion conductor and FIG. 1(B) is a sectional view obtained by cutting the ion conductor of FIG. 1(A) at line C. In FIGS. 1(A) and 1(B), 1 is a solid electrolyte in particulate form and 2 is a supporting substance for the solid electrolyte 1 which is an insulator. The slanted line portions of solid electrolyte 1 in FIG. 1A are the portions of the particulate solid electrolyte hidden, i.e., covered, by the insulating supporting substance 2 for the solid electrolyte 1.

Figure 2A:
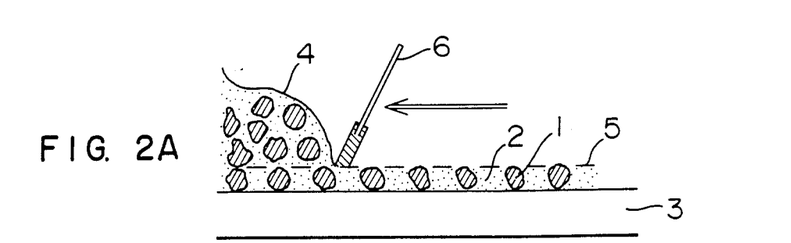
Figure 2B:
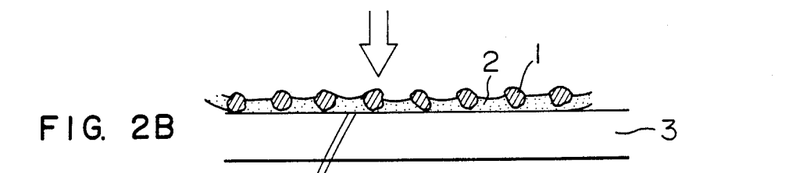
Figure 2C:
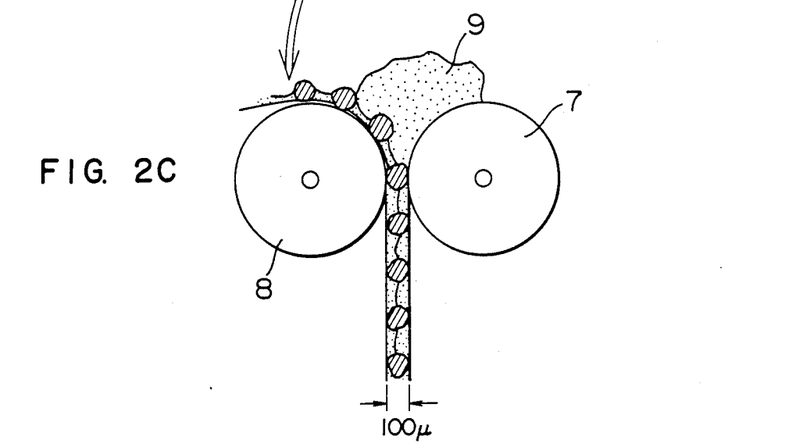

$RbCu_4I_{1.5}Cl_{3.5}$ as a particulate solid electrolyte was ground with a ball mill under dry air, and only the sieve portion of solid electrolyte having particle diameters of 80 to 100 microns was used. A silicone rubber was used as the supporting substance for the solid electrolyte. Preparation of an ion conductor was conducted according the schematic process of FIG. 2. Firstly, the above two materials were mixed at a ratio of 1:1 by weight. Mixing was conducted thoroughly using toluene as a solvent for the silicone rubber in order to sufficiently disperse the particulate solid electrolyte in the silicone rubber. The resulting mixture 4 was screen-printed onto a stainless steel substrate 3 with a spatula 6 through a stainless steel screen 5 of 100 mesh [see FIG. 2(A)]. Then, the toluene was evaporated [see FIG. 2(B)]. Subsequently, the particulate solid electrolyte supported by the silicone rubber was rolled together with a silicone rubber 9 between two rollers 7 and 8 whose gap had been adjusted to 100 microns to obtain an ion conductor sheet having a thickness of 100 microns [see FIG. 2(C)]. This ion conductor sheet showed anisotropy with respect to ion conductivity. The ion conductivity at 25° C. was $4.5 \times 10^{-2} \Omega^{-1} cm^{-1}$ in the thickness direction and $7.3 \times 10^{31}$ $^{12}\Omega^{-1}cm^{-1}$ in the lateral direction.

Examples 2 to 4

Using other particulate solid electrolytes and supporting substances for the solid electrolyte, ion conductors were prepared in the same manner as in Example 1. Each ion conductor showed anisotropy with respect to ion conductivity. The results are shown in Table 1.

TABLE 1

| Example | Solid electrolyte | Supporting substance for solid electrolyte | Solvent | Ion conductivity ($\Omega^{-1}cm^{-1}$) Thickness direction | Lateral direction |
|---|---|---|---|---|---|
| 2 | RbAg$_4$I$_5$ (70 microns) | Styrene-butadiene rubber | Toluene | $6.5 \times 10^{-2}$ | $3.2 \times 10^{-12}$ |
| 3 | 0.5Li$_3$PO$_4$—0.5Li$_4$SiO$_4$ (100 microns) | Neoprene rubber | DMF | $7.2 \times 10^{-8}$ | $2.6 \times 10^{-13}$ |
| 4 | H$_3$(PMo$_{12}$O$_{40}$) · H$_2$O (100 microns) | Silicone rubber | Toluene | $7.8 \times 10^{-2}$ | $4.2 \times 10^{-12}$ |

Example 5

NASICON (Na-super ion conductor), a Na$^+$-conductive solid electrolyte represented by Na$_{1+x}$Zr$_2$P$_{3-x}$Si$_x$O$_{12}$ ($0 \leq x \leq 3$) was ground so as to have particle diameters of $100 \pm 10$ microns, and these particles were used as a particulate solid electrolyte. A polyethylene powder having a particle diameter of 100 microns was used as a supporting substance for the solid electrolyte. In order to prepare an ion conductor sheet, the particulate solid electrolyte and the polyethylene powder were mixed; the mixture was melted at 200° C.; and the melt was rolled between hot rollers whose gap had been adjusted to 100 microns to obtain a sheet. The temperature of the hot rollers was set at 30° C. The sheet had ion conductivities of $7.3 \times 10^{-5} \omega^{-1} cm^{-1}$ in the thickness direction and $2.6 \times 10^{-13} \omega^{-1} cm^{31}$ $^1$ in the lateral direction. By melting, the polyethylene could effectively surround each solid electrolyte particle.

Example 6

An ion conductor sheet was prepared in the same manner as in Example 5 except that the polyethylene as a supporting substance for the solid electrolyte was changed to a polypropylene resin. The sheet had ion conductivities of $5.4 \times 10^{-5} \omega^{-1} cm^{-1}$ in the thickness direction and $2.1 \times 10^{-13} \omega^{-1} cm^{-1}$ in the lateral direction.

Example 7

Figure 3A:
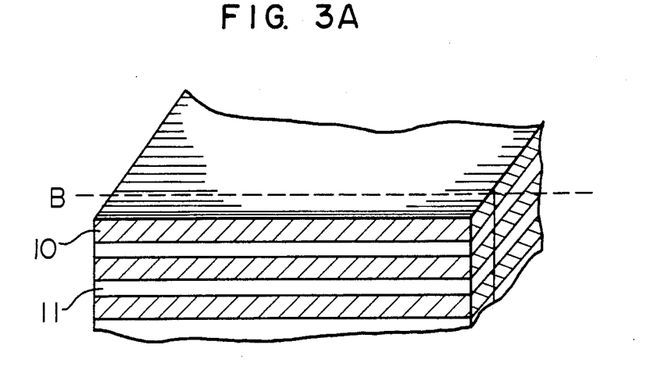
FIG. 3 is an isometric cutaway view showing the structure of an ion conductor having ion conductivity which is anisotropic and which is obtained by solid electrolyte and a sheet of a supporting substance for the solid electrolyte, such as a plastic resin or the like (FIG. 3A), and then cutting the resulting laminate along line B of FIG. 3A (FIG. 3B).
Figure 3B:
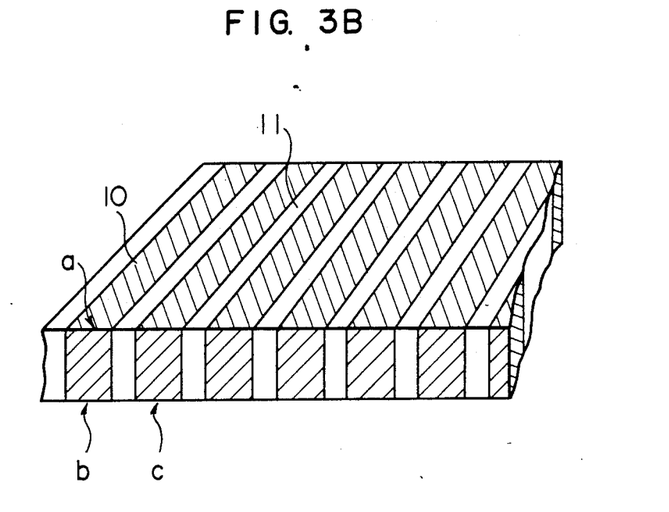

Another embodiment of an ion conductor according to the present invention is shown in FIG. 3. A sheet 10 of a polyethylene oxide (PEO)-LiCF$_3$SO$_3$ polymer electrolyte having a thickness of 100 microns was used as a solid electrolyte. The sheet was prepared by mixing LiCF$_3$SO$_3$ and a PEO having a molecular weight of 750,000, dissolving the mixture in acetonitrile, casting the solution on a stainless steel plate, and evaporating the solvent at 70° C. Separately, a sheet 11 of the PEO alone was prepared in a similar manner. The two sheets were stacked alternatively [see FIG. 3(A)], and the laminate was cut at line B to prepare a zebra-patterned sheet [see FIG. 3(B)]. The sheet was measured for ion conductivities between surfaces a, b and c. Ion conductivity was $3.4 \times 10^{-6} \omega^{-1} cm^{-1}$ between surfaces a and b and $7.1 \times 10^{-13} \omega^{-1} cm^{31}$ $^1$ between surfaces b and c.

Example 8

An ion conductor sheet was prepared in the same manner as in Example 1 except that 60% by weight of white, insulating particles of TiO$_2$ (70 microns in particle diameter) had been added to the silicone rubber of Example 1. The sheet had ion conductivities of $5.7 \times 10^{-1} \omega^{-1}$ cm$^{-1}$ in the thickness direction and $2.2 \times 10^{-13} \omega^{-1} cm^{-1}$ in the lateral direction.

Figure 4A:
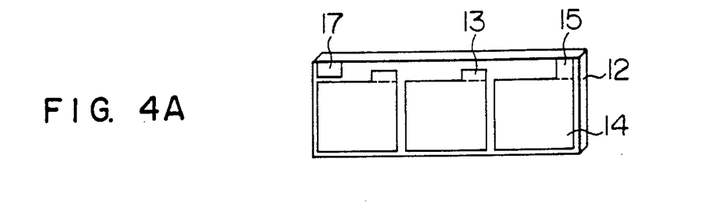
FIG. 4 shows four views (FIGS. 4A-4D) of the structure of a laminated film battery using an ion conductor.
Figure 4B:
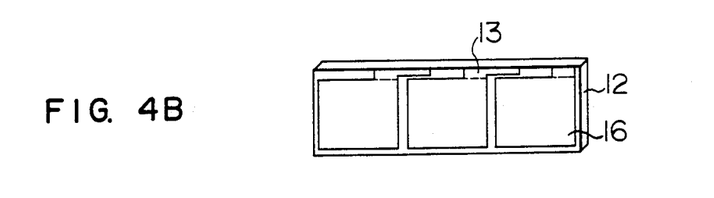
Figure 4C:
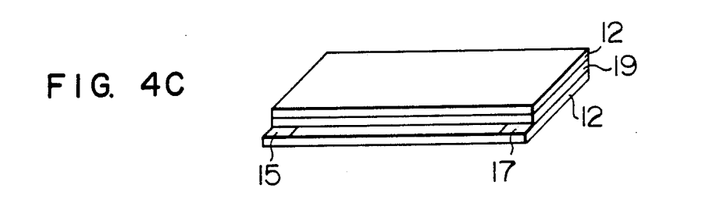
Figure 4D:
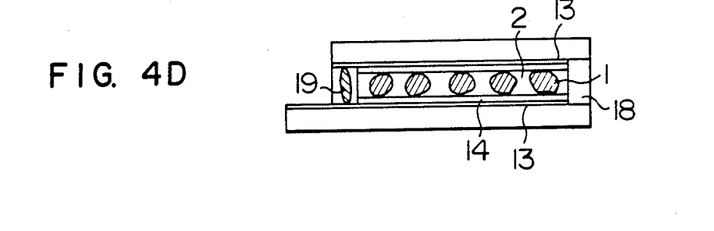

A laminate-type thin film battery was prepared using an ion conductor prepared as described above. The preparation process is shown in FIG. 4. A positive electrode group of the battery is shown in FIG. 4(A) and a negative electrode group is shown in FIG. 4(B). The positive electrode group was prepared by vapor-depositing stainless steel on a glass substrate through a mask to form stainless steel portions 13, 15 and 17 and then vapor-depositing thereon CuI through a mask to form CuI portions 14 in a thickness of 3,000 Å [see FIG. 4(A)]. The portions 15 and 17 later become a positive electrode terminal and a negative electrode terminal, respectively. In a similar manner, the negative electrode group was prepared by vapor-depositing stainless steel on a glass substrate 12 through a mask to form stainless steel portions 13 and then vapor-depositing thereon copper through a mask to form copper portions 16 [see FIG. 4(B)]. The above-mentioned ion conductor sheet consisting of a particulate solid electrolyte 1 and a supporting substance 2 for the solid electrolyte 1 was put between the positive electrode group and the negative electrode group so that the electrode groups faced each other, and the circumference of the resulting laminate was coated with an epoxy adhesive 18, whereby a battery was prepared [see FIG. 4(D)]. The connection of the respective electrode groups was accomplished using indium metal 19. The resulting battery was measured for electromotive force, and a voltage of 1.8 V existed between positive electrode terminal 15 and negative electrode terminal 17. Since the electromotive force of this battery was 0.6 V per single cell, it was found that the use of an ion conductor sheet according to this invention makes it unnecessary to divide the electrolyte into single cell portions. Further, in order to examine an effect when a plastic supporting substance for the solid electrolyte is used, a battery was constituted by using, as a substrate 12 for each electrode group, a polyimide film having a thickness of 0.4 mm. As a result, it was found that the battery had an excellent elasticity. Therefore, this battery was found to be suitable for use as an electric source for IC cards requiring elasticity. It was further found that the ion conductor sheet containing insulating particles, prepared in Example 8, when put between transparent electrodes, produced a sharp pink color on a white background due to the precipitation of copper when a voltage was applied between the transparent electrodes and accordingly is suitable for use as an electrolyte for an electrochromic display.

Example 9

A powder of 5 microns or less as particulate solid electrolyte was sufficiently mixed with a toluene solution containing 10% of a styrene-butadiene copolymer, in a volume ratio of 85 (solid electrolyte) to 15 (copolymer). In mixing, a suitable amount of toluene was used as a diluent.

The mixture thus prepared was a slurry having a slight fluidity. The slurry was extended on a TEFLON sheet in a thickness of 100 microns using an applicator bar. Toluene was evaporated in dry air and then the dried film was rolled into a film thickness of 70 microns using a roller press to crush the solid electrolyte particles, whereby a desired ion conductor was obtained.

In order to measure the ion conductivity, the ion conductor was cut into specimen of 1 cm$^2$. On the two surfaces of the specimen were provided two copper electrodes each having the same size as the specimen, in a sandwich form. This was done by wetting the ion conductor surfaces with toluene and then pressing the cooper electrodes thereon. Subsequently, an AC having a voltage of 10 mV and a frequency of 1 KHz was applied between the two electrodes and the resulting AC resistance was measured. It was $1.5 \times 10^{-4}$ S/cm$^2$.

In a comparative test for examining the effect of crushing by pressing, an ion conductor sheet was prepared according to the following. As a particulate solid electrolyte, there was used a powder having particle diameters of 1 micron or less which was difficult to crush by rolling, and an ion conductor sheet was prepared in the same manner as in Example 9. The resulting ion conductor showed a low ion conductivity of $9.5 \times 10^{-6}$ S/cm$^2$.

An ion conductor sheet was prepared in the same manner as in the sheet of Example 9 except that crushing and rolling was conducted using an ordinary press in place of the roller press. That is, the ion conductor sheet before crushing and rolling was sandwiched between two stainless steel plates (in the form of a square of 10 cm $\times$ 10 cm having a thickness of 1 cm) using spacers of 70 microns in thickness, and a pressure of 1 ton/cm$^2$ was applied by a press to crush the solid electrolyte particles. The resulting ion conductor sheet had an ion conductivity of $9.7 \times 10^{-5}$ S/cm$^2$.

The reason is not yet clear but roller pressing, as compared with ordinary pressing by a press, can crush solid electrolyte particles more effectively and can provided an ion conductor with superior ion conductivity.

Example 10

100 parts by weight of a solid electrolyte, namely, a powder of a $Cu^+$-conductive solid electrolyte, represented by $RbCu_4I_{1.5}Cl_{3.5}$, having an average particle diameter of 10 microns was mixed with 20 parts by weight of a polyethylene powder having an average particle diameter of 0.1 micron in a dry nitrogen atmosphere. The mixture was formed into a shaped solid electrolyte material of 5 mm $\times$ 20 mm $\times$ 100 microns (thickness) using a roller press at a pressure of 200 kg/cm$^2$. In a similar manner, there was obtained a shaped positive electrode material of 5 mm $\times$ 20 mm $\times$ 200 microns (thickness) consisting of 50 parts by weight of a powder of a positive electrode active substance represented by $Cu_{0.1}NbS_2$, having an average particle diameter of 15 microns, 50 parts by weight of the above mentioned solid electrolyte powder and 15 parts by weight of the above mentioned polyethylene powder. Also in a similar manner, there was obtained a shaped negative electrode material of 5 mm $\times$ 20 mm $\times$ 120 microns (thickness) consisting of 50 parts by weight of a powder of a negative electrode active substance (metallic copper) having an average particle diameter of 8 microns, 50 parts by weight of the above mentioned solid electrolyte powder and 25 parts by weight of the above mentioned polyethylene powder. These shaped materials were stacked in three layers and a pressure of 250 kg/cm$^2$ was applied thereto, whereby a copper-type solid cell A was obtained as an integral body.

Example 11

A copper-type solid cell B was obtained in the same manner as in Example 10 except that a polypropylene powder having an average particle diameter of 0.1 micron was used in place of the polyethylene powder.

Comparative Example 1

A copper-type solid cell C was obtained in the same manner as in Example 10 except that no polyethylene powder was used.

Example 12

An Ag-type solid cell D was obtained in the same manner as in Example 10 except that there were used, as a solid electrolyte, a powder of an $Ag^+$-conductive solid electrolyte represented by $RbAg_4I_5$, having an average particle diameter of 8 microns, as a positive electrode active substance, a powder of $Ag_{0.1}NbS_2$ having an average particle diameter of 15 microns, and as a negative electrode active substance, a powder of metallic silver having an average particle diameter of 8 microns.

Comparative Example 2

An Ag-type solid cell E was obtained in the same manner as in Example 12 except that no polyethylene powder was used.

Example 13

A Li-type solid cell F was obtained in the same manner as in Example 10 except that there were used, as a solid electrolyte, a powder of a $Li^+$-conductive solid electrolyte represented by LiI, having an average particle diameter of 15 microns, as a positive electrode active substance, a powder of $WO_3$ having an average particle diameter of 12 microns, and as a negative electrode active substance, a powder of $Li_{1.5}WO_3$ having an average particle diameter of 10 microns.

Comparative Example 3

A Li-type solid cell G was obtained in the same manner as in Example 13 except that no polyethylene powder was used.

Example 14

An H-type solid cell H was obtained in the same manner as in Example 10 except that there were used, as a solid electrolyte, a powder of a $H^+$-conductive solid electrolyte represented by $H_3Mo_{12}PO_{40}.29H_2O$, having an average particle diameter of 20 microns, as a positive electrode active substance, a powder of $WO_3$ having an average particle diameter of 8 microns, and as a negative electrode active substance, a powder of $HWO_3$ having an average particle diameter of 8 microns, and the polyethylene powder was changed to an acrylic resin powder having an average particle diameter of 0.2 micron.

Comparative Example 4

An H-type solid cell I was obtained in the same manner as in Example 14 except that no acrylic resin powder was used.

Example 15

100 parts by weight of a solid electrolyte, namely, a powder of a $CU^+$-conductive solid electrolyte represented by $RbCu_4I_{1.25}Cl_{3.75}$, having an average particle diameter of 2 microns was mixed with 30 parts by weight of a toluene solution containing 10% by weight of a styrene-butadiene rubber to obtain a solid electrolyte slurry. The slurry was extended on a fluororesin plate using a bar coater in a thickness (when dried) of 20 microns and then dried for 3 hours at 50° C. under a reduced pressure of 1 Torr, whereby a solid electrolyte thin film of 60 mm (width)×800 mm (length)×20 microns (thickness) was obtained.

Separately, 50 parts by weight of a graphite powder having an average particle diameter of 0.5 micron and 50 parts by weight of the above-mentioned solid electrolyte powder were mixed with 35 parts by weight of the above-mentioned toluene solution to obtain a positive electrode slurry. In a similar manner and using this slurry, there was obtained a positive electrode thin film of 60 mm (width)×800 mm (length)×30 microns (thickness).

Separately, 50 parts by weight of a metallic copper powder having an average particle diameter of 2 microns, 50 parts by weight of the above-mentioned solid electrolyte powder and 18 parts by weight of the above-mentioned toluene solution were mixed to obtain a negative electrode slurry. In a similar manner and using this slurry, there was obtained a negative electrode thin film of 60 mm (width)×800 mm (length)×20 microns (thickness).

Then, the positive electrode thin film was provided on one surface of the solid electrolyte thin film and the negative electrode thin film was provided on the other surface of the solid electrolyte thin film. They were shaped into one integral body at a pressure of 20 kg/cm² using a roller press of 130° to 150° C. to obtain a thin film of 65 mm (width)×1,000 mm (length)×55 to 65 microns (thickness). This thin film was cut into pieces of 5 mm×20 mm to obtain a solid cell J.

Example 16

A solid cell K was obtained in the same manner as in Example 15 except that the styrene-butadiene rubber was replaced by a silicone resin.

Example 17

A solid cell L was obtained in the same manner as in Example 15 except that the styrene-butadiene rubber was replaced by an acrylic resin.

Example 18

On the two surfaces of a solid electrolyte film having a thickness of 20 microns, obtained in the same manner as in Example 15, were provided an electrode film having a thickness of 30 microns and consisting of a graphite powder, a solid electrolyte powder and a styrenebutadiene rubber, obtained in the same manner as in Example 15. They were shaped into one integral body at a pressure of 20 kg/cm² and at 130° to 150° C. using a roller press to obtain a sheet of 65 mm (width)×1,000 mm (length)×60 to 65 microns (thickness). The sheet was cut into pieces of 5 mm×20 mm to obtain a solid electrical double layer capacitor M.

Example 19

50 parts by weight of a solid electrolyte, namely, a powder of a $H^+$-conductive solid electrolyte represented by $H_3Mo_{12}PO_{40}.29H_2$), having an average particle diameter of 20 microns, 20 parts by weight of an acrylic resin powder having an average particle diameter of 0.2 micron and a graphite powder having an average particle diameter of 0.5 micron were mixed and shaped in the same manner as in Example 10 to prepare a graphite electrode of 5 mm×20 mm×30 microns (thickness). Three layers comprising in the following order (a) the above electrode, (b) a solid electrolyte film of 5 mm×20 mm×50 microns (thickness) consisting of a $H^+$-conductive solid electrolyte and an acrylic resin and (c) a display electrode of 5 mm×20 mm×10 microns (thickness) containing tungsten trioxide ($WO_3$), prepared in the same manner as in Example 14 were pressed into one body, whereby a solid electrochromic display element N of 5 mm×20 mm×85 microns (thickness) was assembled.

The above prepared solid cells A to L, solid electrical double layer capacitor M and solid electrochromic display element N were subjected to a repeated bending test (30° bending in the longitudinal direction). The number of times of bending until breakage occured in each test is shown in Table 2. Also shown in Table 2 is the ratio of $R_1/R_0$ of each of the elements A to N wherein $R_1$ is the internal resistance of an element when the element has been allowed to stand for 48 hours in an atmosphere of 45° C. and 60% humidity and $R_0$ is the initial internal resistance of the element.

All of the solid electrochemical elements A, B, D, F, H, J, K, L, M and N according to the present invention withstand bending of several hundred times to several thousand times, and none of them showed a noticeable increase in internal resistance, when allowed to stand in the atmosphere. Meanwhile, the solid electrochemical elements C, E, G and I for comparison had no flexibility at all and were broken by bending one time and, when allowed to stand in the atmosphere, showed a significant increase in internal resistance.

TABLE 2

| | Cell | | | | | | | |
|---|---|---|---|---|---|---|---|---|
| | A | B | C (comparison) | D | E (Comparison) | F | G (Comparison) | H |
| Bending test, number of times | 357 | 408 | 1 | 296 | 1 | 322 | 1 | 252 |
| $R_1/R_0$ | 2.5 | 3.0 | 12 | 2.0 | 8.0 | 7.5 | 100 | 1.5 |

| | Cell | | | | Solid electrical double layer capacitor M | Solid electro-chromic element N |
|---|---|---|---|---|---|---|
| | I (comparison) | J | K | L | | |
| Bending test, number of times | 1 | No breakage at 3,000 times | Same as left | Same as left | Same as left | Same as left |
| $R_1/R_0$ | 3.5 | 1.5 | 1.5 | 2.0 | 1.5 | 1.5 |

What is claimed is:

1. A solid electrochemical element which is flexible, has improved mechanical strength, and has improved stability upon exposure to the environment, comprising:
   at least one solid electrolyte sheet which is flexible, has a pair of opposing surfaces, and is comprised of solid electrolyte particles and a plastic resin, which plastic resin was coated on each particle of said solid electrolyte particles prior to formation of said at least one solid electrolyte sheet; and
   at least two electrode sheets comprised of an electrode material, one of said at least two electrode sheets being joined to each of said pair of opposing surfaces of said at least one solid electrolyte sheet, wherein the at least one solid electrolyte sheet has a thickness and the solid electrolyte particles have a particle diameter which does not exceed the thickness of the at least one solid electrolyte sheet.

2. The solid electrochemical element according to claim 1, wherein each of the at least two electrode sheets is comprised of electrode material in particulate form and wherein each of the at least two electrode sheets is comprised of a mixture of electrode material particles and solid electrolyte particles.

3. The solid electrochemical element according to claim 2, wherein at least one of the electrode material particles and the solid electrolyte particles of the at least two electrode sheets is coated with a plastic resin.

4. The solid electrochemical element according to claim 1, wherein the solid electrolyte particles are monovalent cation-conductive solid electrolyte particles.

5. The solid electrochemical element according to claim 1, wherein the plastic resin is at least one plastic resin selected from the group consisting of polyethylene, polypropylene, styrene-butadiene rubber, Neoprene rubber, silicone rubber, silicone resin, and acrylic resin.

6. A process for producing a solid electrochemical element which is flexible, has improved mechanical strength and has improved stability upon exposure to the environment, the process comprising:
   a. separately dispersing electrode material particles and solid electrolyte particles in solvent containing a plastic resin dissolved therein to provide respective dispersions;
   b. evaporating solvent from each respective dispersion of step a to form powdery particles, their aggregates or their moldings, consisting of particles coated with plastic resin;
   c. forming at least one solid electrolyte sheet and at least two electrode sheets from the powdery particles, their aggregates or their moldings, respectively comprised of solid electrolyte particles coated with plastic resin and electrode material particles coated with plastic resin, wherein said at least one solid electrolyte sheet is flexible, has a pair of opposing surfaces, and has a thickness, wherein the solid electrolyte particles have a particle diameter which does not exceed the thickness of the at least one solid electrolyte sheet, and wherein said at least two electrode sheets are flexible; and
   d. joining one of the at least two electrode sheets to each pair of opposing surfaces of the at least one solid electrolyte sheet to form the solid electrochemical element.

7. The process for producing a solid electrochemical element according to claim 6, wherein, in step d, joining is accomplished by pressing in which at least one of the electrode material particles and the solid electrolyte particles is crushed by the pressing.

8. The process for producing a solid electrochemical element according to claim 6, wherein the solid electrolyte particles are monovalent cation-conductive solid electrolyte particles.

9. The process for producing a solid electrochemical element according to claim 6, wherein the plastic resin is at least one plastic resin selected from the group consisting of polyethylene, polypropylene, styrene-butadiene rubber, Neoprene rubber, silicone rubber, silicone resin, and acrylic resin.

10. The process for producing a solid electrochemical element according to claim 7, wherein pressing is accomplished in a roller press and wherein the solid electrolyte particles are crushed by the roller press.

11. The process for producing a solid electrochemical element according to claim 6, wherein each of the at least two electrode sheets further comprises solid electrolyte particles which were dispersed in step a with the electrode material particles in solvent containing a plastic resin dissolved therein.

12. The process for producing a solid electrochemical element which is flexible, has improved mechanical strength and has improved stability upon exposure to the environment, the process comprising:
   a. separately mixing solid electrolyte particles and electrode material particles with plastic resin powder to provide respective mixtures;
   b. separately forming using heat at least one solid electrolyte sheet and at least two electrode sheets from the respective mixtures of step a respectively comprised of solid electrolyte particles and plastic resin powder, and electrode material particles and plastic resin powder, wherein said at least one electrolyte sheet is flexible, has a pair of opposing surfaces, and has a thickness, wherein the solid electrolyte particles have a particle diameter which does not exceed the thickness of the at least one solid electrolyte sheet, and wherein said at least two electrode sheets are flexible; and c. joining one of the at least two electrode sheets to each of the pair of opposing surfaces of the at least one solid electrolyte sheet to from the solid electrochemical element.

13. The process for producing a solid electrochemical element according to claim 12, wherein the solid electrolyte particles are monovalent cation-conductive solid electrolyte particles.

14. The process for producing a solid electrochemical element according to claim 12, wherein the plastic resin is at least one plastic resin selected from the group consisting of polyethylene, polypropylene, and acrylic resin.

15. The process for producing a solid electrochemical element according to claim 12, wherein, in step c, joining is accomplished by pressing in which at least one of the solid electrolyte particles and the electrode material particles is crushed by the pressing.

16. The process for producing a solid electrochemical element according to claim 15, wherein pressing is accomplished in a roller press and wherein the solid electrolyte particles are crushed by the roller press.

17. The process for producing a solid electrochemical element according to claim 12, wherein each of the at least two electrode sheets further comprises solid electrolyte particles which were mixed in step a with the electrode material particles.

* * * * *